March 17, 1942.     G. W. PENNEY     2,276,861
HIGH VOLTAGE RECTIFIER
Filed Oct. 20, 1939     2 Sheets-Sheet 1
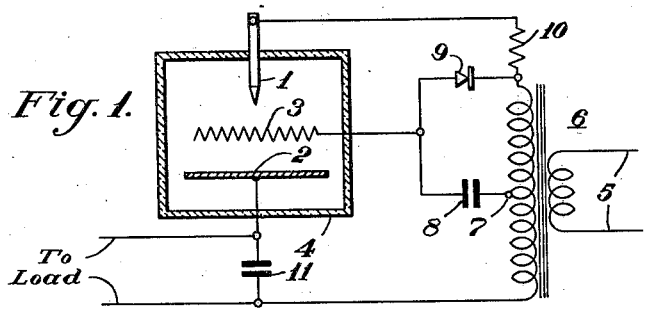
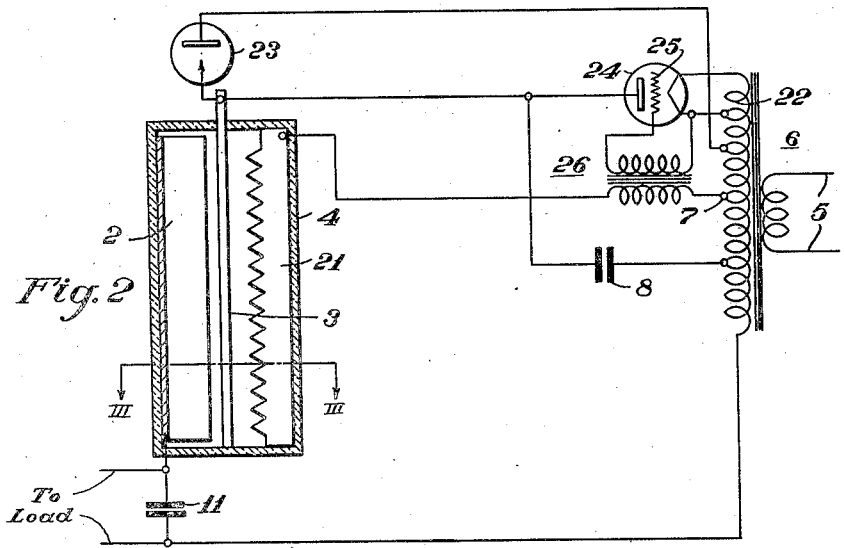
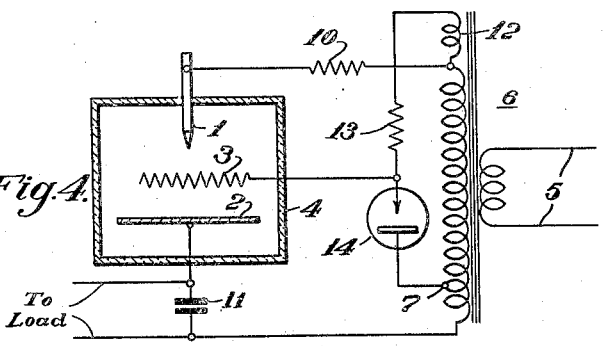
WITNESSES:
INVENTOR
Gaylord W. Penney.
BY
ATTORNEY March 17, 1942.   G. W. PENNEY   2,276,861
HIGH VOLTAGE RECTIFIER
Filed Oct. 20, 1939   2 Sheets-Sheet 2
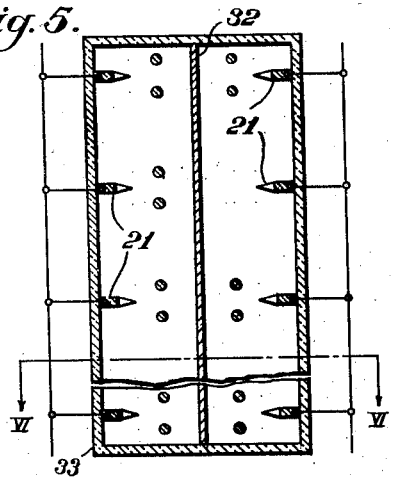
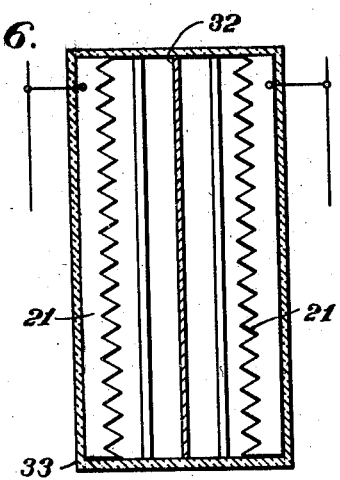
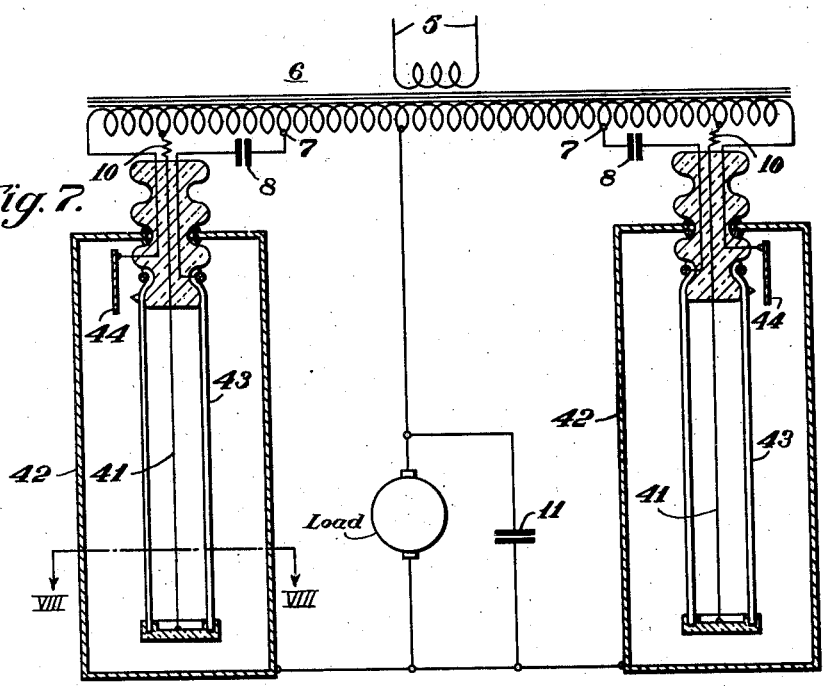
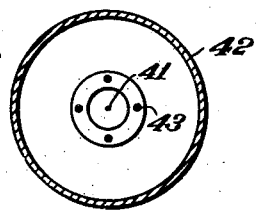
WITNESSES:
INVENTOR
Gaylord W. Penney.
BY
ATTORNEY Patented Mar. 17, 1942

2,276,861

UNITED STATES PATENT OFFICE 2,276,861

HIGH VOLTAGE RECTIFIER

Gaylord W. Penney, Wilkinsburg, Pa., assignor to Westinghouse Electric & Manufacturing Company, East Pittsburgh, Pa., a corporation of Pennsylvania Application October 20, 1939, Serial No. 300,391

11 Claims. (Cl. 175—363)

My invention relates to a rectifier device and in particular to such a device of the type known as the point-to-plane rectifier for converting high potentials. This so-called point-to-plane has heretofore been known but because of its high back current, very little commercial application has been found for such devices.

I have discovered that if the point-to-plane discharge device is placed in an atmosphere which does not form negative ions, the efficiency of the device is greatly increased so that the ratio of useable current is sufficiently great for commercial applications. Furthermore, I have discovered that such a converter may be grid controlled so that the back current is further materially limited and also such grid control may be utilized to stop the discharge in the forward direction as well as in the inverse direction.

In the conversion system according to my invention the point-to-plane electrodes are placed in an atmosphere of non-negative ion forming gas such as nitrogen, hydrogen, helium, etc. This point-to-plane device in a gas which does not provide negative ions, produces a ratio of forward current to back current such that the device is suitable for providing current to direct current devices requiring high voltage at relatively low currents. Further, by providing a control grid between the point and the plane, the back current can be reduced so that the ratio of forward current to back current compares favorably to other unilateral conducting devices. In order to make the device conductive, the grid is charged at a potential of the order of the potential which that point in space would take if no grid were present. In order to prevent the flow of back current during the non-conducting half cycle, the control grid, or more correctly speaking, a control electrode, is charged at a potential approximately that of the point electrode. In order to interrupt forward current during the current carrying half cycle, the grid is given a charge equal to or more negative than a charge of the point electrode.

It is, therefore, an object of my invention to provide a unilateral conducting device for rectifying high potentials.

A further object of my invention is to provide a high efficiency point-to-plane discharge device.

It is a further object of my invention to provide a discharge system in which the flow of current can be controlled.

Other objects and advantages of my invention will be apparent from the following detailed description taken in conjunction with the accompanying drawings, in which:

Figure 1 is a schematic illustration of a conversion system according to my invention;

Fig. 2 is a similar view of a conversion device capable of handling higher currents;

Fig. 3 is a sectional view taken along the line III—III of Fig. 2;

Fig. 4 is a view similar to the Fig. 1 showing modified means for applying the control potential;

Fig. 5 is a fragmentary cross-sectional view of a high current converter according to my invention;

Fig. 6 is a sectional elevational view taken along the line VI—VI of Fig. 5;

Fig. 7 is a similar view of a further modification according to my invention; and Fig. 8 is a sectional view taken along the line VIII—VIII of Fig. 7.

In the illustrative embodiment of my invention according to Fig. 1, a point electrode 1 is spaced from a plane electrode 2, and intermediate between the point 1 and the plane 2 is placed a suitable control electrode herein illustrated as a control grid 3. All of these electrodes are placed in a suitable container herein illustrated as a vitreous container 4, which container 4 is filled with a suitable gas which does not form negative ions. Preferably, the gas in the container 4 is substantially at atmospheric pressure. I have found that nitrogen, hydrogen, helium, etc. are suitable gases for operation of such a device. The electrodes are charged from a suitable alternating current source 5 by means of a high potential transformer 6, the plane electrode 2 being the anode and the point electrode 1 being the cathode. The control electrode 3 is connected to some point 7 in the transformer device 6 by means of a suitable capacitor 8 so that during the period when negative potential is applied to the point electrode 1, the control electrode 3 will receive a charge approximately equal to that which the point in space occupied by the electrode 3 would receive if no electrode 3 were present.

In order to apply a potential similar to the cathode potential during the inverse half cycle, that is, the half cycle when the point electrode 1 is positive, a suitable unilateral conducting device 9 is connected between the transformer device 6 and the control electrode 3.

In order to control the forward current, a suitable impedance device herein illustrated as a resistor 10 is placed in series between the terminal of the transformer device 6 and the cathode 1. In the event of a high forward current, the voltage drop through the resistor 10 will bring the cathode 1 and the control electrode 3 to substantially the same potential so that the forward current will be materially reduced or even completely interrupted. If desired, a suitable capacitor 11 may be connected across the terminal leads of the device to smooth the current supplied by the converter.

In the operation of this device the alternating potential applied by the transformer 6 is supplied to the electrodes 1 and 2, and in the interval when the point electrode 1 is positive, the point 7 will be connected through the capacitor 8 by the unidirectional conductor 9 so that the capacitor will be charged to the potential appearing between the point 7 and the terminal of the transformers, so that the control electrode 3 is substantially at the potential of cathode 1 and the device is blocked. However, when the polarity of the transformer 6 reverses so that a negative potential is impressed on cathode 1 the unidirectional conductor 9 traps the charge on the capacitor 8 so that control electrode 3 is positive with respect to cathode 3.

The point 7 being so selected that the charge on electrode 3 is substantially equal to the space charge which would be present at the space occupied by electrode 3 if no electrode 3 had been present, the grid or control electrode 3 is then ineffective and a discharge flows between main electrodes 1 and 2.

In the event of an unduly large forward current, the series resistor 10 will cause a voltage drop such that the point electrode 1 will be brought more nearly to the potential of the control electrode 3 so that the flow of current will be materially reduced if not completely interrupted.

In the modification according to Figs. 2 and 3, a large number of points have been provided on the cathode 21 so that a materially larger current may be carried by the device. In order to insure the absence of reverse current during the interval when the cathode 21 is positive, additional turns 22 have been provided on the transformer device 6, which additional turns are connected through a suitable unilateral conducting device herein illustrated as an auxiliary point to plane rectifier 23 so that a higher positive potential is applied to the control electrode 3 than is applied to the cathode 1. In this modification means are provided responsive to sudden increase in the forward current for applying a potential to the control electrode 3 which is more negative than the cathode potential. The additional turns 22 on the transformer device 6 are connected through an auxiliary rectifier device 24 to the control electrode 3, the grid 25 of the auxiliary rectifier 24 being triggered by a reactance device 26 connected in series with the cathode 21. Any sudden increase of current to the cathode 21 will then trigger the auxiliary rectifier 24 and apply a high negative potential to the control electrode 3 and thus effectively stop any discharge in the device.

Instead of utilizing a capacitor to secure the charge on the control electrode, a resistor may be utilized as shown in Fig. 4. The transformer 6 is provided with auxiliary turns 12 which are connected to electrode 3 through a high resistance 13 which in turn is connected to point 7 of the main winding by a suitable unidirectional conductor 14 herein shown as an auxiliary point to plane device. When the cathode is negative, the point of the auxiliary point-to-plane is also negative and current will flow in the auxiliary device and the voltage drop through the resistor then is impressed on the control electrode and as the drop through the resistor is high as compared to the drop through the auxiliary device, the electrode 3 will be substantially at the potential of point 7 and allow current to flow between electrodes 1 and 2. However, when the cathode 1 is positive the auxiliary device 14 will block the flow of current and, therefore, electrode 3 will be at substantially the potential of cathode 1 or even more positive and thus block the flow of current between electrodes 1 and 2.

In order to increase the current through such a converter, it is necessary to materially increase the anode area and to increase the effective number of points composing the cathode.

In Figs. 5 and 6 I have shown a method of securing this increased electrode by providing an anode in the form of a sheet or plate of metal 32 and a plurality of cathodes 21 cooperating with each side of the anode plate 32, the entire structure being enclosed in a suitable container 33 which obviously might be the portion of the converter itself and the container being filled with a suitable gas which does not form negative ions. Each of these cathodes may be a multiple point device such as illustrated in Fig. 5 by providing a plurality of serrated knife-edged members 21.

In the modification according to Figs. 7 and 8, I have illustrated a simplified full wave converter according to my invention. The anodes are provided in the form of cylindrical tubes 42 and the cathode is provided in the form of a fine wire 41 centrally disposed within the anode and suitably insulated therefrom. The control electrode then comprises a plurality of small rods 43 placed in annular formation between the cathode 41 and anode 42 which grid is connected as before to suitable points 7 in the transformer device 6 by means of suitable capacitors 8. The auxiliary rectifier for charging the grid during the non-conducting half cycle is herein illustrated as an auxiliary point-to-plane rectifier 44 placed within the main anode 42. If desired, the anode 42 may form the container for the device as illustrated so that the necessary non-negative ion forming gas may be contained within the anode proper within the provision of any further casing.

While for purposes of illustration, I have shown and described the specific embodiments of my invention, it is apparent that changes and modifications can be made therein without departing from the true spirit of my invention or the scope of the appended claims.

I claim as my invention:

1. An electric conversion system comprising an alternating current circuit, a direct current circuit, transformer means interconnecting said circuits, an electrical translating device controlling the flow of current between said circuits, said translating device including a plate-like anode, a fine wire cathode characterized by discharge from the sides of the wire, a grid between said cathode and anode, an atmosphere of a gas which does not form negative ions filling the space between said anode and cathode, capacitor means connected between said transformer means and said grid, said capacitor means being operative during the interval that said cathode is negative to impress a potential on said grid corresponding to the potential which the space of said grid would have if no grid were present, and auxiliary rectifier means for impressing cathode potential on said grid when said cathode is positive.

2. An electric conversion system comprising an alternating current circuit, a direct current circuit, transformer means interconnecting said circuits, an electrical translating device controlling the flow of current between said circuits, said translating device including a plate-like anode, a fine wire cathode characterized by discharge from the sides of the wire, a grid between said cathode and anode, an atmosphere of a gas which does not form negative ions filling the space between said anode and cathode, capacitor means connected between said transformer means and said grid, said capacitor means being operative during the interval that said cathode is negative to impress a potential on said grid corresponding to the potential which the space of said grid would have if no grid were present, and auxiliary rectifier means for impressing cathode potential on said grid when said cathode is positive and means responsive to abnormal current flow to said cathode to cause said cathode and said grid to assume the same potential.

3. An electric translating system comprising an alternating current circuit, a direct current circuit, transformer means interconnecting said circuits, unilaterally conducting means for controlling the flow of current between said circuits including an anode of large surface area, a wire cathode of small surface area characterized in that the discharge takes place from the sides of the wire spaced from said anode, a grid composed of elements having a large surface area compared to said cathode and a small surface area when compared to said anode, means operative during the period when the cathode is negative to impress a voltage on said grid of the order of magnitude of the space charge of the position of the grid and means operative when said cathode is positive to charge said grid at the cathode potential.

4. A high voltage rectifier system comprising, a hollow cylindrical anode, a fine wire cathode characterized by discharge from the sides of the wire centrally disposed in said anode, a grid between said anode and cathode, a filling of a gas which does not form negative ions in the space within said anode, an alternating current circuit, transformer means associated with said alternating current circuit, a connection from said transformer means to said cathode for impressing an alternating potential on said cathode, means operative during the interval of negative potential on said cathode to impress on the grid a potential approximately that which that point in space would take if no grid were there.

5. A high voltage rectifier system comprising a hollow cylindrical anode, a fine wire cathode characterized by discharge from the sides of the wire centrally disposed in said anode, a grid between said anode and cathode, a filling of a gas which does not form negative ions in the space within said anode, an alternating current circuit, transformer means associated with said alternating current circuit, a connection from said transformer means to said cathode for impressing an alternating potential on said cathode, means operative during the interval of negative potential on said cathode to impress on the grid a potential approximately that which that point in space would take if no grid were there, and means responsive to abnormal current flow to said cathode to reduce the potential difference between said cathode and said grid.

6. A high voltage rectifier system comprising, a hollow cylindrical anode, a fine wire cathode characterized by discharge from the sides of the wire centrally disposed in said anode, a grid between said anode and cathode, a filling of a gas which does not form negative ions in the space within said anode, an alternating current circuit, transformer means associated with said alternating current circuit, a connection from said transformer means to said cathode for impressing an alternating potential on said cathode, means operative during the interval of negative potential on said cathode to impress on the grid a potential approximately that which that point in space would take if no grid were there.

7. An electric discharge device comprising an anode of substantial surface area, a cathode spaced from said anode, said cathode having an active surface area constituting a fine wire characterized in that the discharge takes place from the sides of the wire, transformer means for impressing a high potential between said anode and cathode, a control electrode between said anode and cathode and means responsive to abnormal current flow to said device to impress a blocking potential on said control electrode.

8. An electric discharge device comprising an anode of substantial surface area, a cathode spaced from said anode, said cathode having an active surface area constituting a fine wire characterized in that the discharge takes place from the sides of the wire, transformer means for impressing a high potential between said anode and cathode, a control electrode between said anode and cathode, a reactance device connected between said transformer means and said cathode, a control connection to said transformer means, an auxiliary grid controlled discharge device connected between said control connection and said control electrode and a connection to said grid controlled discharge device to trigger said auxiliary discharge device in response to abnormal current flow through said reactance device.

9. A unilaterally conducting device comprising an anode of large surface area, a cold cathode of fine wire characterized in that the discharge takes place from the sides of the wire spaced from said anode, a grid interposed between said anode and cathode, said grid being composed of elements having a large surface area when compared to said cathode and a small surface area when compared to said anode, and an atmosphere of gas which does not form negative ions in the space between said anode and cathode.

10. A unilateral conducting device comprising an envelope, an atmosphere of gas which does not readily form negative ions within the space enclosed by said envelope, a cold cathode of a configuration producing the effect of a fine wire electrode characterized by discharge from the sides thereof, an anode of a configuration producing the effect of a plane electrode, a control-electrode disposed in operative relation to the anode and cathode, said anode, cathode and control-electrode being disposed within said envelope, and means for providing external terminal-leads for said anode, cathode and control-electrode.

11. The invention as defined in claim 10, in combination with external potential-means for applying, to the control-electrode, during the conductive periods of the device, a potential which is positive with respect to the cathode and negative with respect to the anode, and for applying, to the control-electrode, during the non-conducting periods of the device, a potential operative to block discharge.

GAYLORD W. PENNEY.